(12) United States Patent
Chen et al.

(10) Patent No.: US 10,332,308 B2
(45) Date of Patent: Jun. 25, 2019

(54) GRAPHIC RENDERING QUALITY IMPROVEMENTS THROUGH AUTOMATED DATA TYPE PRECISION CONTROL

(71) Applicant: Intel Corporation, Santa Clara, CA (US)

(72) Inventors: Feng Chen, Shanghai (CN); Yi Yang, Shanghai (CN); Xiaoming Chen, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 42 days.

(21) Appl. No.: 15/525,023

(22) PCT Filed: Dec. 8, 2014

(86) PCT No.: PCT/CN2014/093296
§ 371 (c)(1),
(2) Date: May 5, 2017

(87) PCT Pub. No.: WO2016/090535
PCT Pub. Date: Jun. 16, 2016

(65) Prior Publication Data
US 2017/0358129 A1    Dec. 14, 2017

(51) Int. Cl.
*G06T 1/00* (2006.01)
*G06T 15/80* (2011.01)
(Continued)

(52) U.S. Cl.
CPC .......... *G06T 15/80* (2013.01); *G06F 9/30014* (2013.01); *G06F 9/3861* (2013.01); *G06T 1/20* (2013.01); *G06T 15/005* (2013.01)

(58) Field of Classification Search
CPC ......... G06T 15/005; G06T 1/20; G06T 15/04; G09G 5/363; G06F 9/3851
(Continued)

(56) References Cited

U.S. PATENT DOCUMENTS 5,579,518 A * 11/1996 Yasumatsu ............ G06F 9/4491
717/131
2004/0093319 A1 * 5/2004 Ogasawara ........... G06F 8/4441
(Continued)

FOREIGN PATENT DOCUMENTS

CN    101779219    7/2010
CN    104183008    12/2014

OTHER PUBLICATIONS

Andrew Koenig and Bjarne Stroustrup, "Exception Handling for C++" (Oct. 6, 2014, AT&T Bell Laboratories), Retrieved on Aug. 11, 2018. Retrieved from Internet. <<URL: https://web.archive.org/web/20141006075431/http://www.stroustrup.com/except89.pdf>>.*

(Continued)

*Primary Examiner* — Gordon G Liu
(74) *Attorney, Agent, or Firm* — Green, Howard & Mughal LLP

(57) ABSTRACT

One or more system, apparatus, method, and computer readable media is described below for automated data type precision control capable of improving rendering quality on a graphics processor. Perceptible rendering quality is dependent at least in part on number format precision (e.g., FP16 or FP32) employed for shader program variables. In accordance with embodiments, shader variables implemented in lower precision data formats are tracked during shader compile to identify those that might trigger a floating point overflow and/or underflow exception. For shaders including one or more such variable, resources are provided to automatically monitor overflow and/or underflow exceptions during shader execution. In further embodiments, shader code is automatically re-generated based, at least in part, upon occurrences of such exceptions, and an increased number format precision specified for one or more of the tracked shader variables.

19 Claims, 15 Drawing Sheets

(51) Int. Cl.
    *G06T 15/00*     (2011.01)
    *G06T 1/20*     (2006.01)
    *G06F 9/30*     (2018.01)
    *G06F 9/38*     (2018.01)

(58) Field of Classification Search
    USPC .......................................................... 345/522
    See application file for complete search history.

(56) References Cited

U.S. PATENT DOCUMENTS

2008/0216073 A1*   9/2008   Yates ................. G06F 9/30174
                                                                       718/100
2009/0033672 A1    2/2009   Jiao et al.
2014/0327689 A1*  11/2014  Maravelias ........... G06T 11/001
                                                                       345/582

OTHER PUBLICATIONS

International Preliminary Report on Patentability for International Patent Application No. PCT/CN2014/093296, dated Jun. 22, 2017.
International Search Report and Written Opinion International Application No. PCT/CN2014/093296 dated Sep. 22, 2015, 6 pages.
OpenGL ES 2.0 API and Shading Language 1.0 Quick Reference Cards, 2010 Khronos Group—Rev. 0210, 4 pages.
OpenGL ES Common Profile Specification Version 2.0.25 (Full Specification), Nov. 2, 2010, 204 pages.

* cited by examiner

SAMPLE COMMAND FORMAT
900

Shader Properties 1201

| Shader ID | Precision Upgrade Bit | Shader Metadata |
|---|---|---|
| Shader i | 1 | Metadata$_i$ |
| ⋮ | ⋮ | ⋮ |
| Shader j | 0 | Metadata$_j$ |

FIG. 12

| Instruction Address | Variable ID | Upgrade Result Bit |
|---|---|---|
| Instruction Address n | Variable ID$_a$ | 1 |
| ⋮ | ⋮ | ⋮ |
| Instruction Address m | Variable ID$_b$ | 0 |

Precision Upgrade Bit Table 1301

FIG. 13

GRAPHIC RENDERING QUALITY IMPROVEMENTS THROUGH AUTOMATED DATA TYPE PRECISION CONTROL

CLAIM OF PRIORITY

This application is a National Phase Application of, and claims priority to, PCT Application No. PCT/CN2014/093296, filed on 8 Dec. 2014, titled "GRAPHIC RENDERING QUALITY IMPROVEMENTS THROUGH AUTOMATED DATA TYPE PRECISION CONTROL", which is incorporated by reference in its entirety for all purposes.

BACKGROUND

Rendering quality is a key metric for evaluating a low power GPU. A common design issue related to rendering quality is float precision. A graphics library often must perform a number of floating-point operations in the course of operation. Data type precision typically needs to be specified in every shader. Graphics processing implementations normally perform computations in floating-point, and must meet the range and precision requirements defined in a specification as the precision qualifier can significantly affect behavior in many implementations. The OpenGL ES Shading Language Specification (e.g., GLSL 1.1, Jun. 6, 2014), for example, specifies range and precision requirements during shader execution. Within GLSL, an implementation is allowed to vary the representation of numeric values, both within a shader and between different shaders. "High-p" variables have the maximum range and precision available (e.g., 32-bit IEEE 743 floating point), but may cause operations to run more slowly on some implementations. For "medium-p" and "low-p", GLSL only specifies the minimal precision requirement, with a GPU vendor having the freedom to select the final implementation. Medium-p (mediump) and low-p (lowp) variables implemented in FP16 can deliver better performance, for example in terms of frames/sec but will result in lower rendering quality relative to a FP32 implementation.

Depending on data type precision definitions, one graphics implementation of medium-p and low-p data types may provide better or worse rendering quality at the expense of at the expense of pixel processing capability. A graphics processing implementation that is able to retain the performance of a low precision medium-p data type, without suffering from lower rendering quality would advantageously excel at both rendering quality and FPS benchmarks.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 12 illustrates shader properties, which are stored in a memory in accordance with some embodiments;

FIG. 13 illustrates associations of a shader variable with an instruction address, and a precision upgrade result bit, which are stored in a memory in accordance with some embodiments;

DETAILED DESCRIPTION OF EXEMPLARY EMBODIMENTS

Figure 1:
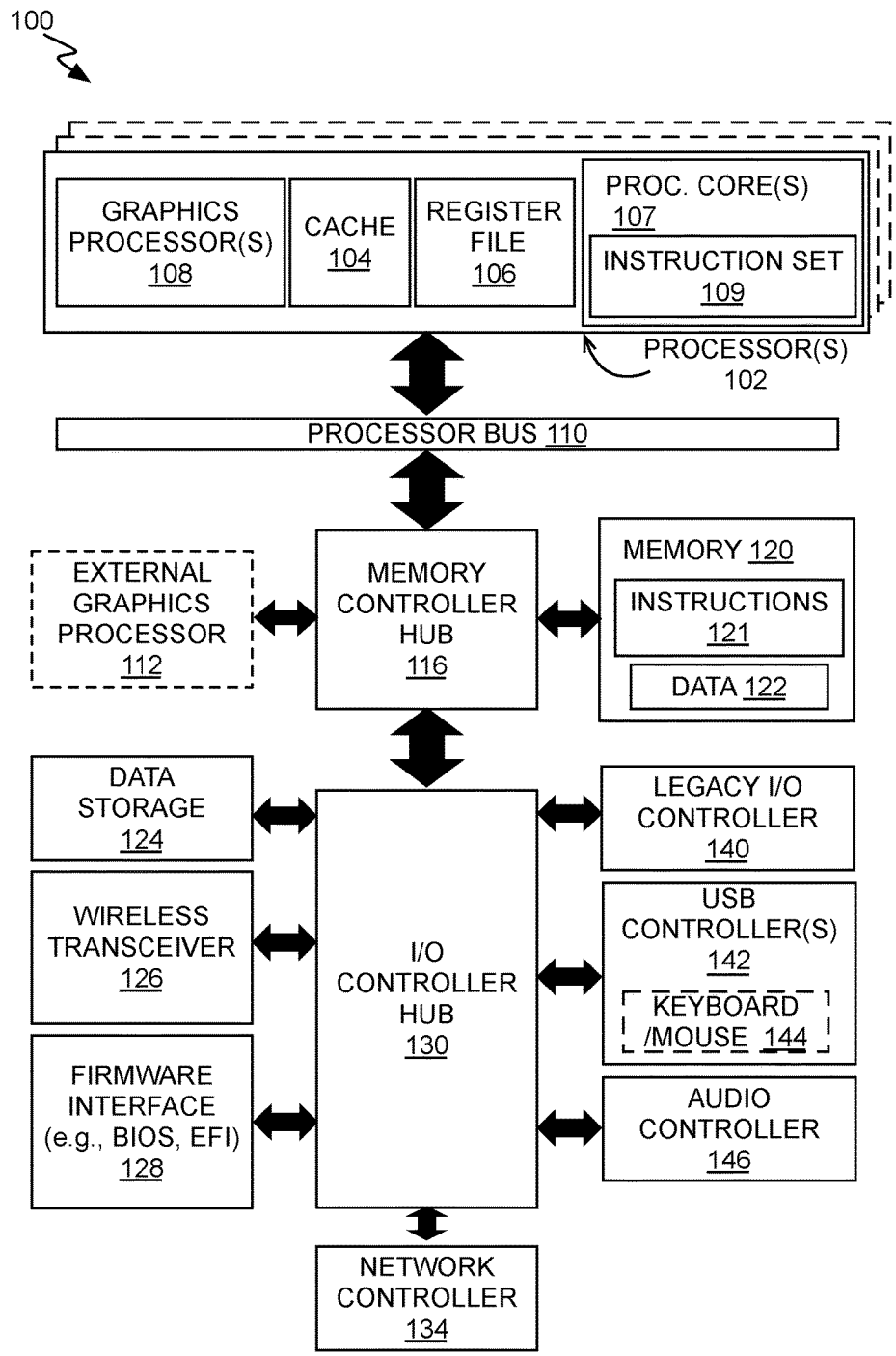
FIG. 1 is a block diagram of a data processing system, according to some embodiments.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment," "in one embodiment," or "in some embodiments" in various places throughout this specification are not necessarily referring to the same embodiment(s). Furthermore, the particular features, structures, functions, or characteristics described in the context of an embodiment, or "some embodiments" may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and in the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

Unless otherwise specified, the terms "substantially," "close," "approximately," "near," and "about" employed herein refer a margin of +/−20% of a nominal or target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

One or more system, apparatus, method, and computer readable media is described below for automated data type precision control capable of improving rendering quality on a graphics processor. Perceptible rendering quality is dependent at least in part on number format precision (e.g., FP16 or FP32) employed for shader program variables. In accordance with embodiments described below, shader variables implemented in lower precision data formats, such as, but not limited to medium-p and low-p precision qualifiers described in GLSL specification 1.1, Jun. 6, 2014, are tracked during shader compile to identify those that might trigger an overflow and/or underflow exception. For shaders including one or more such variable, resources are provided to automatically monitor overflow and/or underflow exceptions during shader execution. In further embodiments, shader code is automatically re-generated based, at least in part, upon occurrences of such exceptions. In further embodiments, re-generated shader code defines an increased number format precision for one or more of the tracked shader variables associated with one or more occurrence of an overflow and/or underflow exception. As such, object rendering in accordance with embodiments may utilize a fast shader implementation employing lower precision variable representations that can be dynamically increased to a higher number format precision as needed for one or more shader variable to avoid exceptions that may otherwise degrade rendering quality.

System Overview

FIG. 1 is a block diagram of a data processing system 100, according to an embodiment. Data processing system 100 includes one or more processors 102 and one or more graphics processors 108, and may be a single processor desktop system, a multiprocessor workstation system, or a server system having a large number of processors 102 or processor cores 107. In on embodiment, the data processing system 100 is a system-on-a-chip (SoC) integrated circuit for use in mobile, handheld, or embedded devices.

An embodiment of data processing system 100 can include, or be incorporated within a server-based gaming platform, a game console, including a game and media console, a mobile gaming console, a handheld game console, or an online game console. In some embodiments, data processing system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processors cores 107 to process instructions which, when executed, perform operations for system and user software. In some embodiments, each of the one or more processors cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW).

Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit data signals between processor 102 and other components in system 100. System 100 uses an exemplary 'hub' system architecture, including a memory controller hub 116 and an input output (I/O) controller hub 130. Memory controller hub 116 facilitates communication between a memory device and other components of system 100, while I/O Controller Hub (ICH) 130 provides connections to I/O devices via a local I/O bus.

Memory device 120 can be a dynamic random access memory (DRAM) device, a static random access memory (SRAM) device, flash memory device, or some other memory device having suitable performance to serve as process memory. Memory 120 can store data 122 and instructions 121 for use when processor 102 executes a process. Memory controller hub 116 also couples with an optional external graphics processor 112, which may communicate with the one or more graphics processors 108 in processors 102 to perform graphics and media operations.

In some embodiments, ICH 130 enables peripherals to connect to memory 120 and processor 102 via a high-speed I/O bus. The I/O peripherals include an audio controller 146, a firmware interface 128, a wireless transceiver 126 (e.g., Wi-Fi, Bluetooth), a data storage device 124 (e.g., hard disk drive, flash memory, etc.), and a legacy I/O controller for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110.

Figure 2:
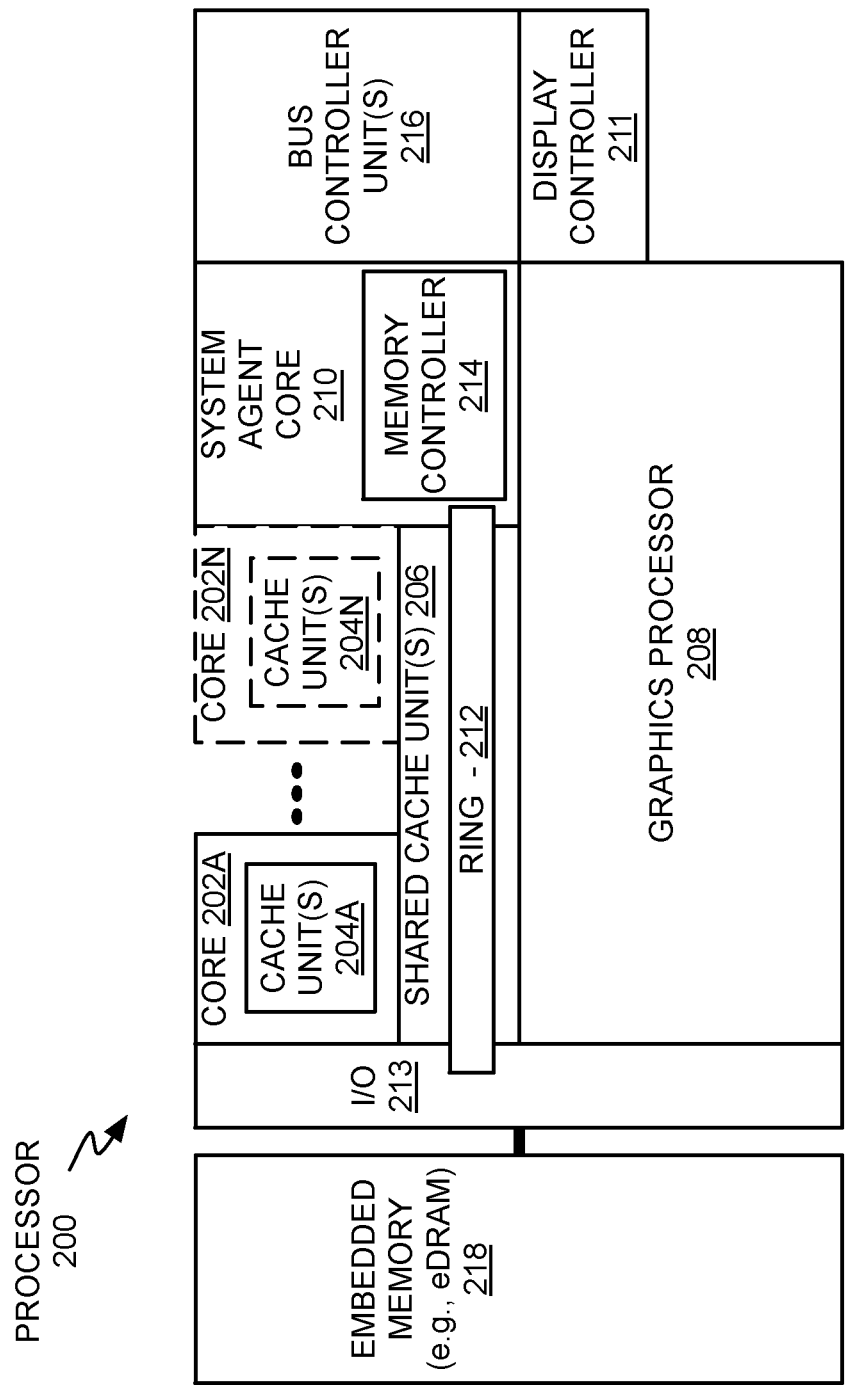
FIG. 2 is a block diagram of an embodiment of a processor having one or more processors cores, an integrated memory controller, and an integrated graphics processor, according to some embodiments.

FIG. 2 is a block diagram of an embodiment of a processor 200 having one or more processors cores 202A-N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of cores 202A-N includes one or more internal cache units 204A-N. In some embodiments each core also has access to one or more shared cached units 206.

The internal cache units 204A-N and shared cache units 206 represent a cache memory hierarchy within the processor 200. The cache memory hierarchy may include at least one level of instruction and data cache within each core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-N.

In some embodiments, processor 200 may also include a set of one or more bus controller units 216 and a system agent 210. The one or more bus controller units manage a set of peripheral buses, such as one or more Peripheral Component Interconnect buses (e.g., PCI, PCI Express). System agent 210 provides management functionality for the various processor components. In some embodiments, system agent 210 includes one or more integrated memory controllers 214 to manage access to various external memory devices (not shown).

In some embodiments, one or more of the cores 202A-N include support for simultaneous multi-threading. In such embodiment, the system agent 210 includes components for coordinating and operating cores 202A-N during multi-threaded processing. System agent 210 may additionally include a power control unit (PCU), which includes logic and components to regulate the power state of cores 202A-N and graphics processor 208.

In some embodiments, processor 200 additionally includes graphics processor 208 to execute graphics processing operations. In some embodiments, the graphics processor 208 couples with the set of shared cache units 206, and the system agent unit 210, including the one or more integrated memory controllers 214. In some embodiments, a display controller 211 is coupled with the graphics processor 208 to drive graphics processor output to one or more coupled displays. In some embodiments, display controller 211 may be separate module coupled with the graphics processor via at least one interconnect, or may be integrated within the graphics processor 208 or system agent 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the cores 202-N and graphics processor 208 use embedded memory modules 218 as a shared Last Level Cache.

In some embodiments, cores 202A-N are homogenous cores executing the same instruction set architecture. In another embodiment, cores 202A-N are heterogeneous in terms of instruction set architecture (ISA), where one or more of cores 202A-N execute a first instruction set, while at least one of the other cores executes a subset of the first instruction set or a different instruction set.

In some embodiments, processor 200 is a part of, or implemented on, one or more substrates using any of a number of process technologies, for example, Complementary metal-oxide-semiconductor (CMOS), Bipolar Junction/Complementary metal-oxide-semiconductor (BiCMOS) or N-type metal-oxide-semiconductor logic (NMOS). Additionally, processor 200 can be implemented on one or more chips or as a System-On-Chip (SOC) integrated circuit having the illustrated components, in addition to other components.

Figure 3:
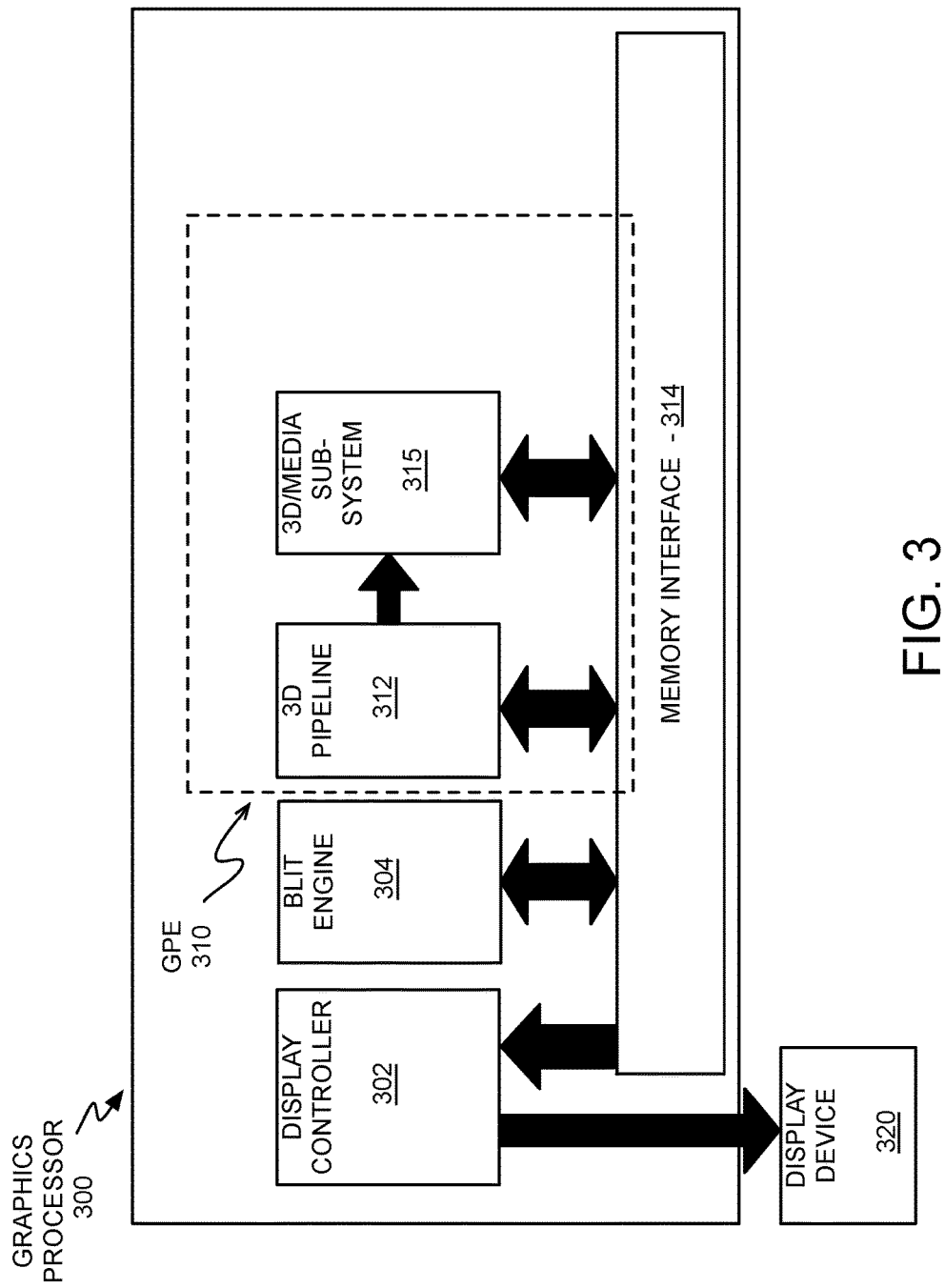
FIG. 3 is a block diagram of a graphics processor, according to some embodiments.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of the graphics-processing engine (GPE) 310. In some embodiments, graphics-processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
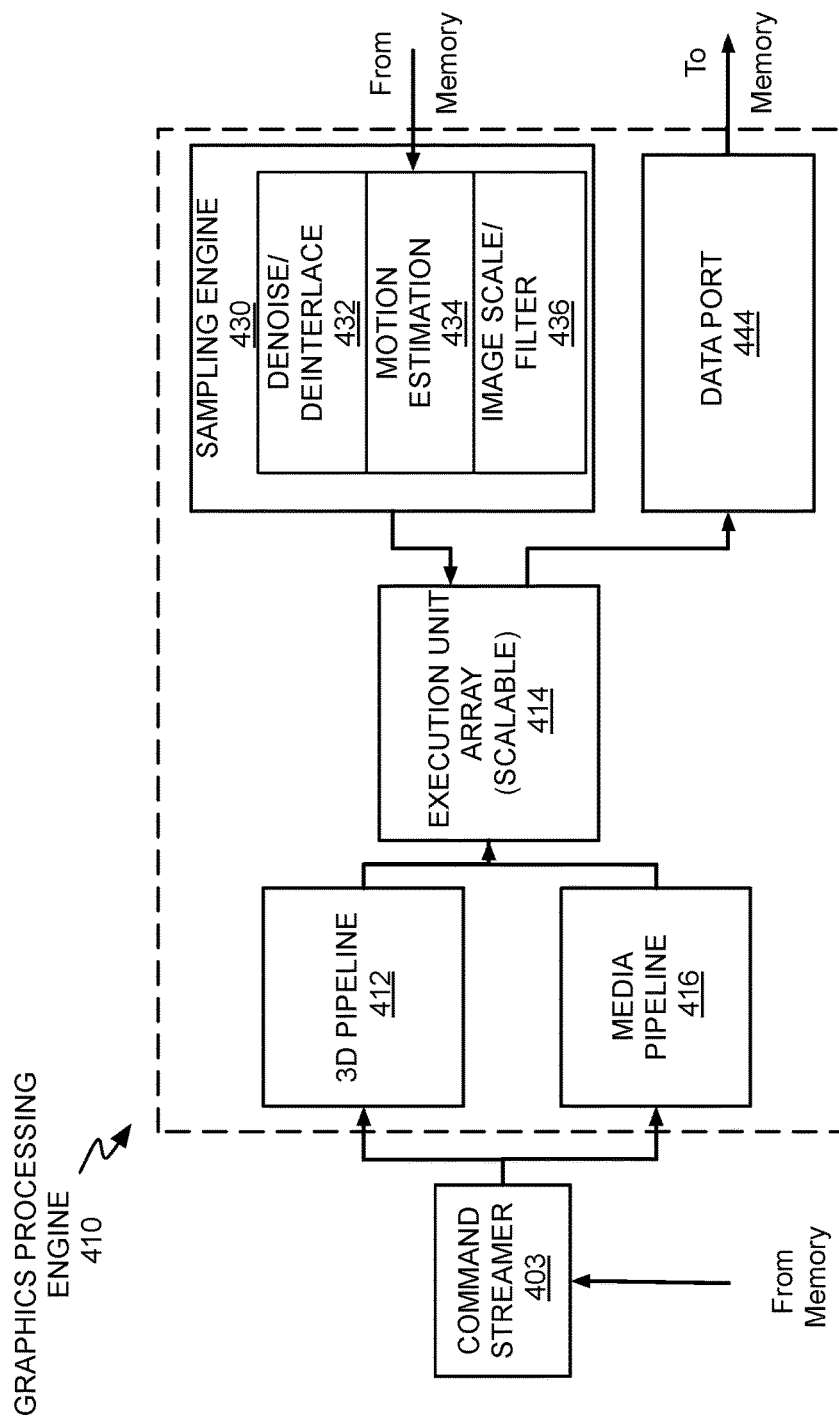
FIG. 4 is a block diagram of an embodiment of a graphics processing engine for a graphics processor, according to some embodiments.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The 3D and media pipelines process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
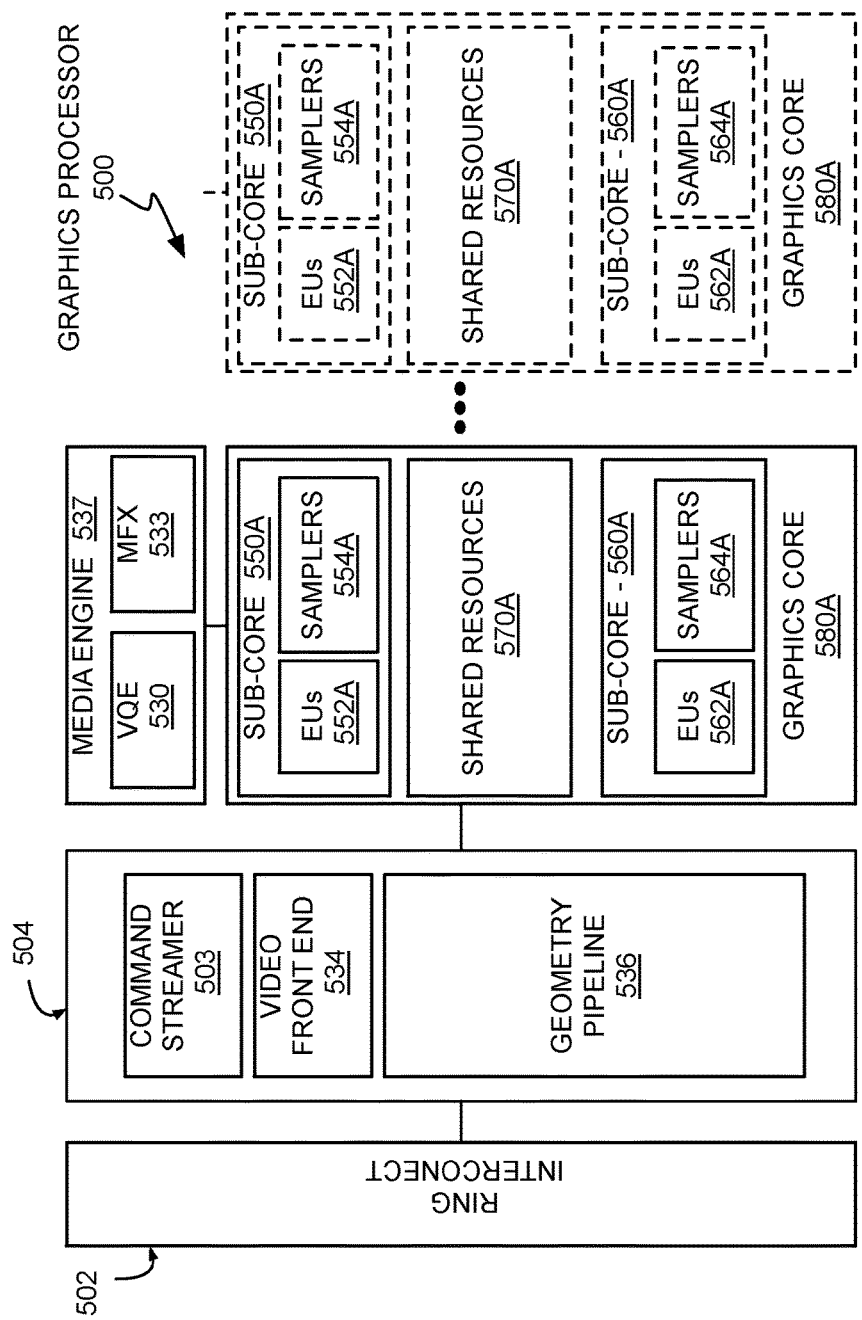
FIG. 5 is a block diagram of another embodiment of a graphics processor, according to some embodiments.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-N (sometimes referred to as core slices), each having multiple sub-cores 550A-N, 560A-N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-N, each including a set of first sub-cores 550A-N and a set of second sub-cores 560A-N. Each sub-core in the set of first sub-cores 550A-N includes at least a first set of execution units 552A-N and media/texture samplers 554A-N. Each sub-core in the set of second sub-cores 560A-N includes at least a second set of execution units 562A-N and samplers 564A-N. In some embodiments, each sub-core 550A-N, 560A-N shares a set of shared resources 570A-N. In some embodiments, the shared resources include shared cache memory and pixel operation logic. Other shared resources may also be included in the various embodiments of the graphics processor.

Figure 6:
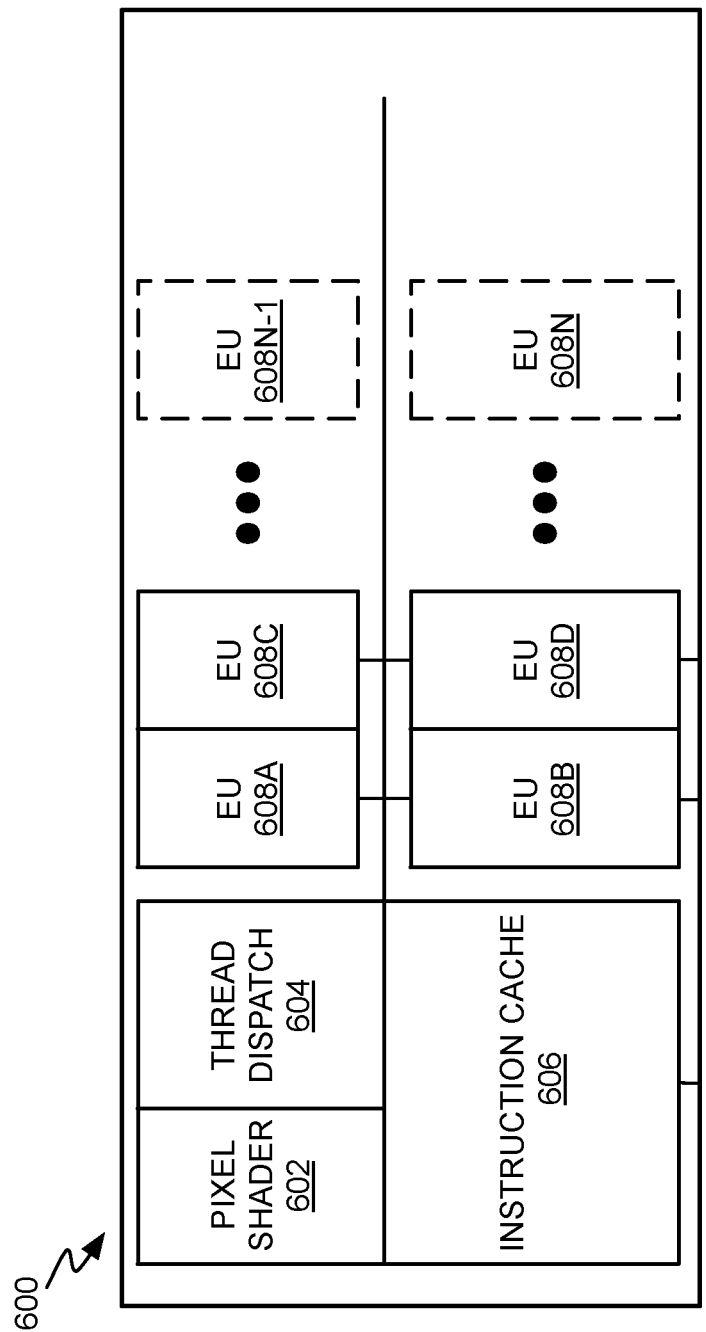
FIG. 6 illustrates thread execution logic including an array of processing elements employed in a graphics processing engine, according to some embodiments.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-N. In some embodiments, each execution unit (e.g. 608A) is an individual vector processor capable of executing multiple simultaneous threads and processing multiple data elements in parallel for each thread. In some embodiments, execution unit array 608A-N includes any number individual execution units.

In some embodiments, execution unit array 608A-N is primarily used to execute "shader" programs. In some embodiments, the execution units in array 608A-N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via a thread spawning and dispatch logic. In some embodiments, thread execution logic 600 includes a local thread dispatcher 604 that arbitrates thread initiation requests from the graphics and media pipelines and instantiates the requested threads on one or more execution units 608A-N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects have been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an API-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
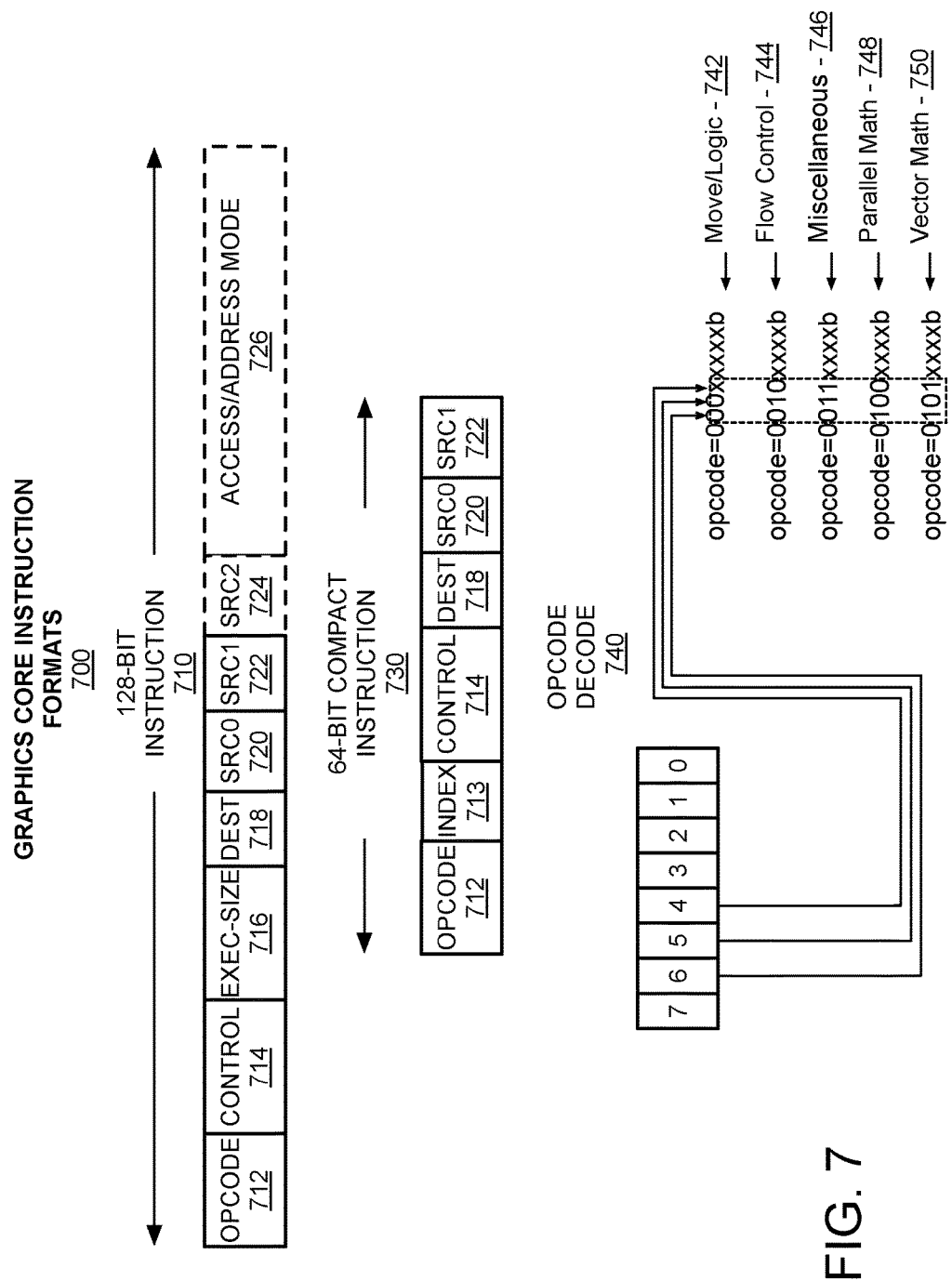
FIG. 7 is a block diagram illustrating a graphics processor execution unit instruction format, according to some embodiments.

FIG. 7 is a block diagram illustrating a graphics processor execution unit instruction format 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 712 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode JJ12 determines the number of source operands. An instruction's last source operand can be an immediate (e.g., hard-coded) value passed with the instruction.

In some embodiments instructions are grouped based on opcode bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb (e.g., 0x0x) and logic instructions are in the form of 0001xxxxb (e.g., 0x01). A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
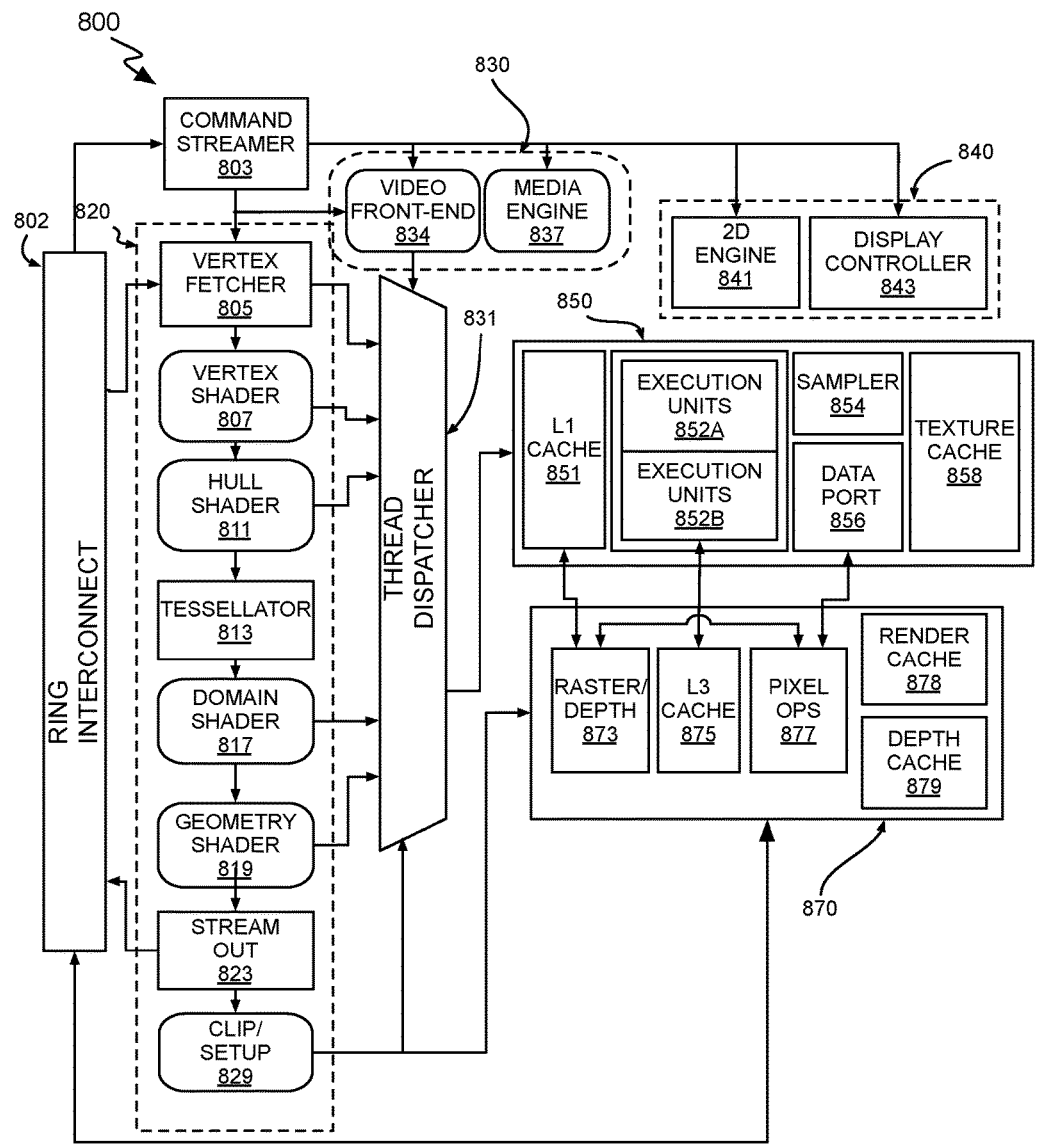
FIG. 8 is a block diagram of another embodiment of a graphics processor, which includes a graphics pipeline, a media pipeline, a display engine, thread execution logic, and a render output pipeline, according to some embodiments.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Prior to rasterization, vertex data is processed by a clipper 829, which is either a fixed function clipper or a programmable clipper having clipping and geometry shader functions. In some embodiments, a rasterizer 873 in the render output pipeline 870 dispatches pixel shaders to convert the geometric objects into their per pixel representations. In some embodiments, pixel shader logic is included in thread execution logic 850.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into their associated pixel-based representation. In some embodiments, the rasterizer logic includes a windower/masker unit to perform fixed function triangle and line rasterization. Associated render and depth buffer caches 878, 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 337 and a video front end 834. In some embodiments, video front end 834 receives pipeline commands from the command streamer 803. In some embodiment media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9A:
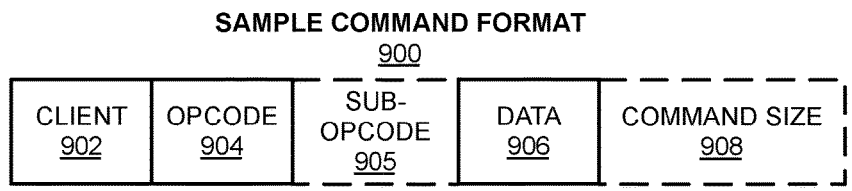
FIG. 9A is a block diagram illustrating a graphics processor command format, according to some embodiments.
Figure 9B:
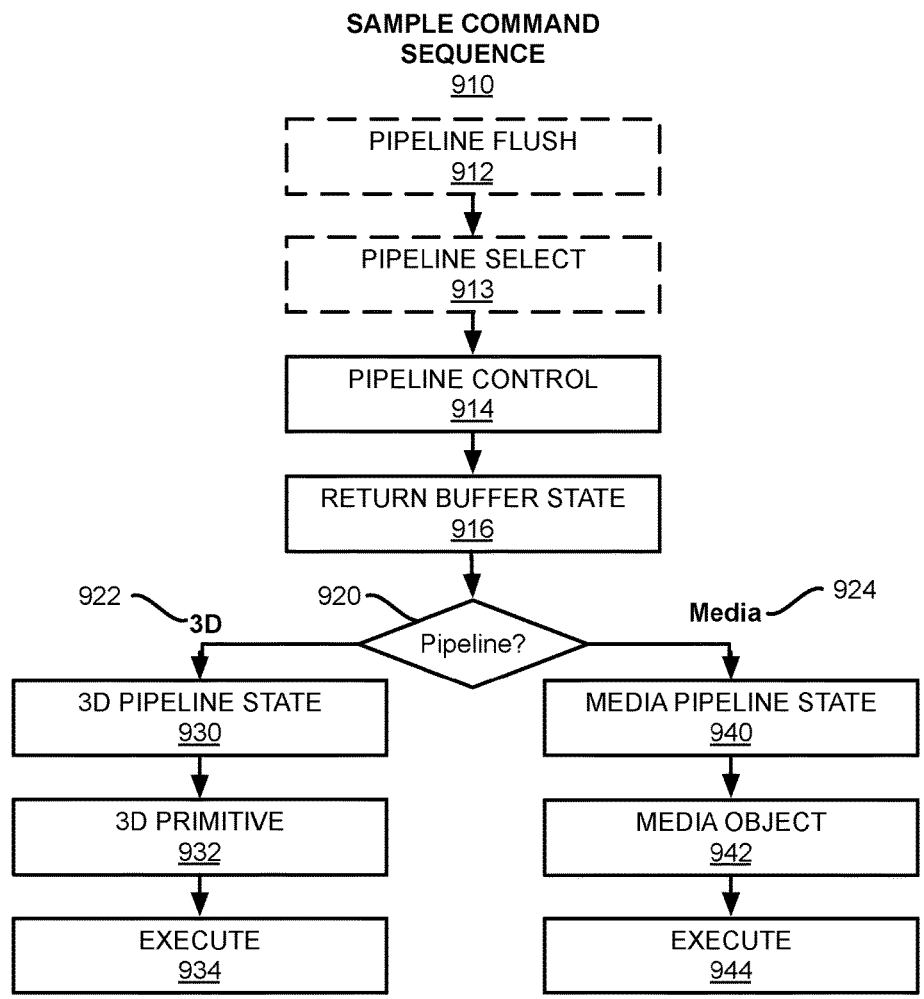
FIG. 9B is a block diagram illustrating a graphics processor command sequence, according to some embodiments.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, sample command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, sample command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 934 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
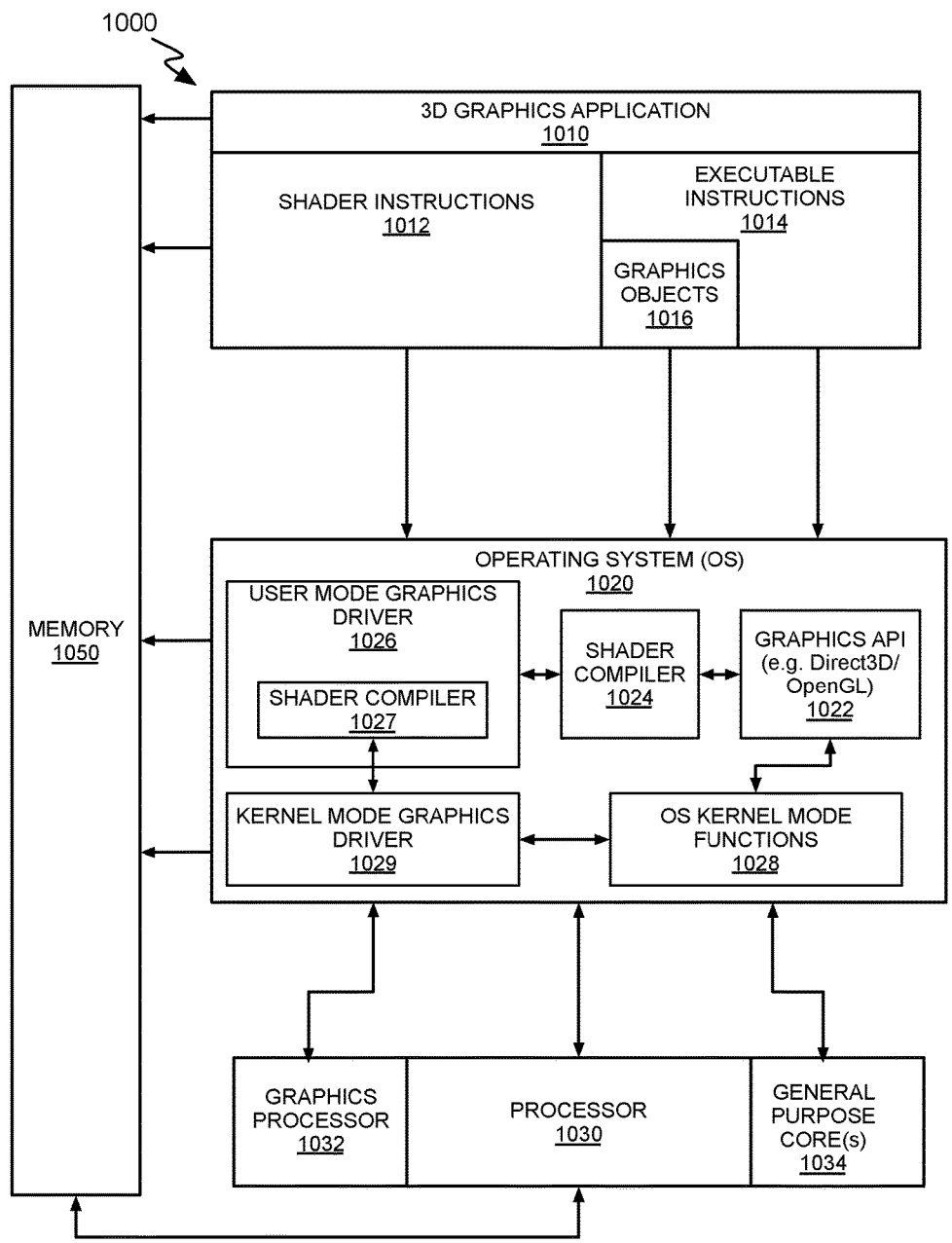
FIG. 10 illustrates exemplary graphics software architecture for a data processing system, according to some embodiments.

FIG. 10 illustrates exemplary graphics software architecture 1000 for a data processing system according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

Shader Code Compilation

Figure 11:
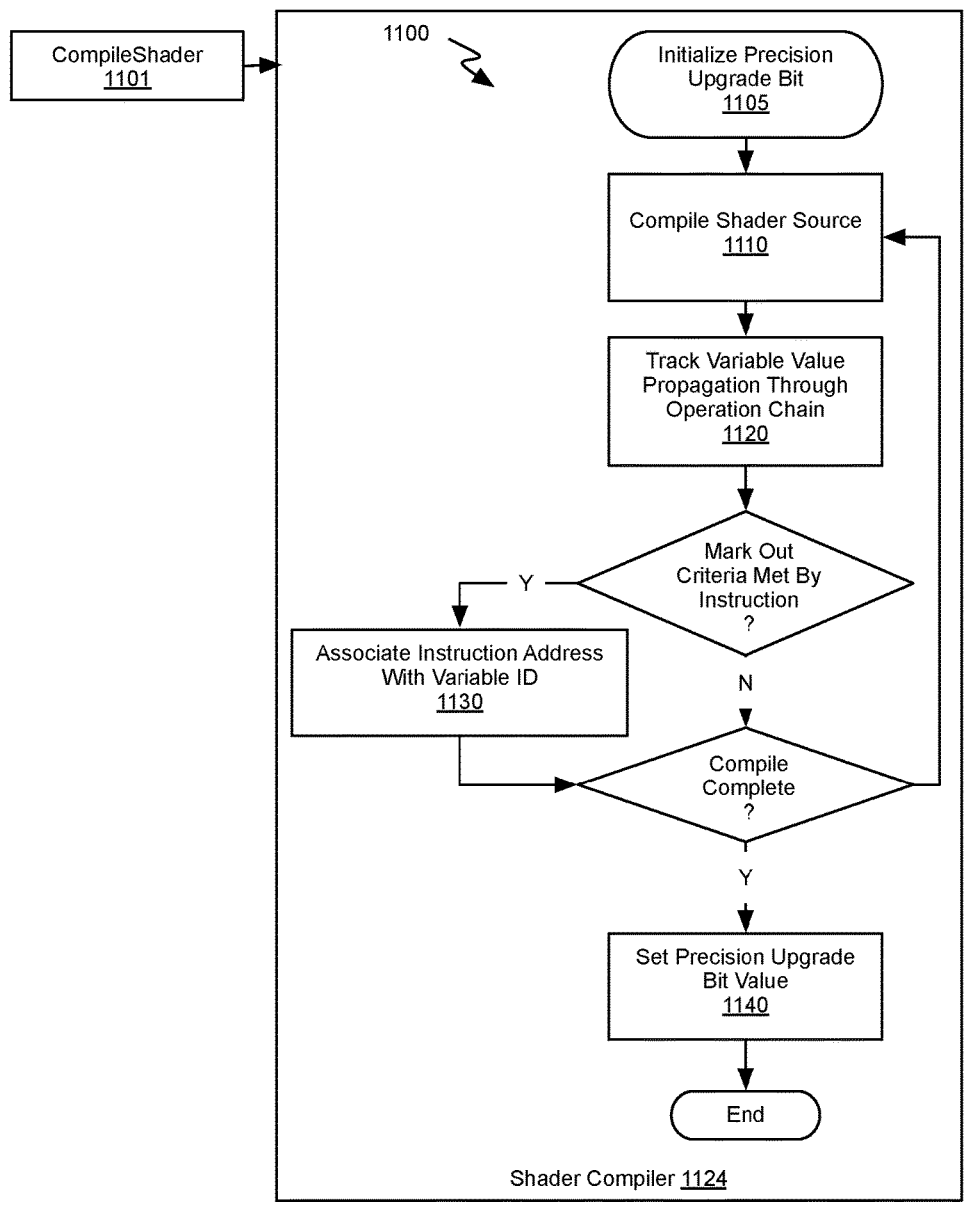
FIG. 11 is a flow chart illustrating a shader code compilation method, in accordance with some embodiments.

FIG. 11 is a flow chart illustrating a shader code compilation method 1400, in accordance with some embodiments. Elements of FIG. 11 having the same reference numbers (or names) as the elements of any other figure herein can operate or function in any manner similar to that described elsewhere herein, but are not limited to such. In the embodiments illustrated by FIG. 11, shader code compilation method 1100 is performed by shader compiler 1124. Shader compiler 1124 may be either a front-end shader compiler (e.g., compiler 1024 in FIG. 10), or a back-end shader compiler (e.g., compiler 1027 in FIG. 10), or a combination of both. In some embodiments, shader code compilation method 1400 is performed in part by front-end compiler, and in part by a back-end compiler.

In some embodiments, method 1100 is performed as CompileShader function 1101 to generate a compiled shader machine (object) code that may include one or more linked shader objects defined in shader source code. In some embodiments, the shader machine code is executable by a shader execution unit, such as, but not limited to either of execution units 852A, 852B (FIG. 8). In some other embodiments, the shader machine code is executable by the same processor that generates the shader machine code. For example, in some software rendering embodiments where the graphics pipeline is implemented without a hardware accelerator, a processor core generates shader code with a Low Level Virtual Machine (LLVM) compiler and the shader code is then executed by the processor core during the software rendering.

In some embodiments, each compiled shader output by method 1100 is associated with a flag bit, the value of which is indicative of whether a higher precision implementation of one or more shader variable is possible (i.e., "shader can be upgraded to a higher precision implementation"). In further embodiments, the precision upgrade bit value is further indicative of whether a shader that can be upgraded (e.g., has some medium-p variables) is also susceptible to variable value overflow or underflow during execution. This flag bit is referred to herein as a "precision upgrade bit" because for situations where the flag is set, a precision upgraded may improve rendering quality. The shader "variable" referred to herein may be any variable in a shader program, such as, but not limited to, a local variable, global variable, static variable, etc., as embodiments are not limited in this respect. The shader compiled by method 1100 may be any, such as, but not limited to, vertex shaders, hull shaders, domain shaders, geometry shaders and pixel shaders, as embodiments herein are not limited in this respect. Certain shaders (e.g., a vertex shader) in which all variables are typically defined to have a maximum precision (e.g., high-p of FP32), would typically not be candidates for a precision upgrade. Other shaders (e.g., a pixel shader) where at least some variables are typically defined to have a lower precision (e.g., medium-p of FP16), may be more-likely candidates to receive an automated precision upgrade in conformance with various embodiments described herein.

In some embodiments, and as further described below, graphics processor resource allocation for a particular compiled shader program is dependent upon a value of the precision upgrade bit associated with that shader. In some embodiments, the precision upgrade bit may be associated with a shader by adding the bit as another field of metadata for each shader instance. In some embodiments, and as illustrated in FIG. 12, the precision upgrade bit is a property in a set of shader properties 1201 for each of a plurality of shaders (e.g., shaders i-j). Associations between the precision upgrade bit and a particular shader instance may be maintained in memory in any manner employed for conventional shader metadata. As further illustrated in FIG. 11, the precision upgrade bit value for a shader is initialized at operation 1105 to a known value (e.g., 0). In some embodiments, the initialized value indicates, as a default, the number format precision of an associated shader is not upgradeable.

Compile method 1100 continues at operation 1110 where any known techniques may be used to compile shader language instructions (i.e., source code, bytecode, etc.) into (virtual) machine code, opcode, object code, etc. In one exemplary embodiment, compilation at operation 1110 receives input shader language instructions specifying one or more low-precision implementation of one or more shader variable. For example, where a precision qualifier for one or more shader variable specifies less than the highest number format precision possible for the variable data type (e.g., floating point, integer, etc.), the compiler allocates a narrow bit width to implement the variable. More specifically, where a shader variable is defined as a floating point (or integer) data type of "medium-p" or "low-p", less than a maximum possible bit width (e.g., FP16 instead of FP32) is allocated.

At operation 1120, the shader variables to be implemented with less than the highest number format precision are tracked through their operation chains as compile operation 1110 proceeds through the shader source language instructions. Any known value propagation chain analysis/tracking techniques may be employed at operation 1120 to identify instructions involved with the tracked variables as the machine code is emitted (jitted). In some embodiments, each instruction that might generate (floating point) overflow and/or underflow exceptions is marked out as an overflow candidate instruction address. Instruction types employed as the mark out criteria include, but are not limited to, multiply instructions, multiply-add instructions, dot-product instructions, plane instructions, texture read instructions, and memory read instructions. For example, in the following pseudo code, both "b" and "c" are overflow/underflow exception candidate variables meeting an exemplary arithmetic instruction mark out criteria defined for a shader compiler:

```
//Shader 0
    medium-p a=23.1
    medium-p d=...
    medium-p b=a*a+d*d
    medium-p c=sqrt(b)
    ...
//
```

In some embodiments, operations 1110 and 1120 proceed until all machine code has been emitted for the shader. In the event no instructions meet the mark out criteria, the precision upgrade bit value is set to indicate the shader is not a precision upgrade candidate (i.e., not a candidate for throwing an overflow/underflow error as a result of number format precision (e.g., precision upgrade bit=0). In response to at least one shader instruction meeting the mark out criteria, method 1100 proceeds to operation 1130 where an instruction address is stored in association with an identifier of the one or more exception candidate variable. The instruction address is stored in association with an identifier of either the head variable of the value propagation chain involving the instruction address, or of the last intermediate expression in the chain. For example, in further reference to the pseudo code above, an identifier of either "a" or "b" may be stored in association with an instruction address for "b," above. The instruction address written by the compiler may follow any addressing mode applicable to the processor executing the compiler. In some embodiments, the instruction address stored by the compiler may be a relative instruction address including an offset parameter added to the address of the next instruction.

FIG. 13 illustrates associations between overflow/underflow exception candidate shader variables, exception candidate instruction addresses, and precision upgrade result bits, which are stored in memory at operation 1130 in accordance with some embodiments. As shown, precision upgrade bit table 1301 is a 2D data structure including an entry for each candidate instruction address n-m. Each candidate instruction address is associated with an exception candidate variable identifier (e.g., $ID_a$-$ID_b$) and an upgrade bit result field. The instruction addresses stored in precision upgrade bit table 1301 serve as points where the shader machine code emitted at operation 1110 may be advantageously modified to higher precision in response to a (floating point) overflow and/or underflow exception being thrown during execution of the shader code (e.g., by an execution unit). As described further below, the mark outs generated by the shader compiler are to be employed to allocate appropriate graphics processor resources to the exception susceptible shader for detecting and accumulating overflow and underflow exception occurrences during shader execution on the graphics processor. After shader run time, the upgrade bit result field in the precision upgrade bit table 1301 functions as an exception flag bit to be populated by a graphics processor driver for each candidate instruction address. In some embodiments, the value stored to the upgrade bit result field is to be indicative of whether execution of the shader code associated with the candidate variable generated one or more overflow and/or underflow exception. In the event one or more instructions meet the mark out criteria, and the precision upgrade bit table has been created for the shader, the precision upgrade bit value is set (e.g., precision upgrade bit=1) at operation 1140 to indicate the shader is a candidate for automated precision upgrade (i.e., the shader is a candidate for throwing an overflow/underflow error as a result of number format precision).

Shader Execution

Figure 14:
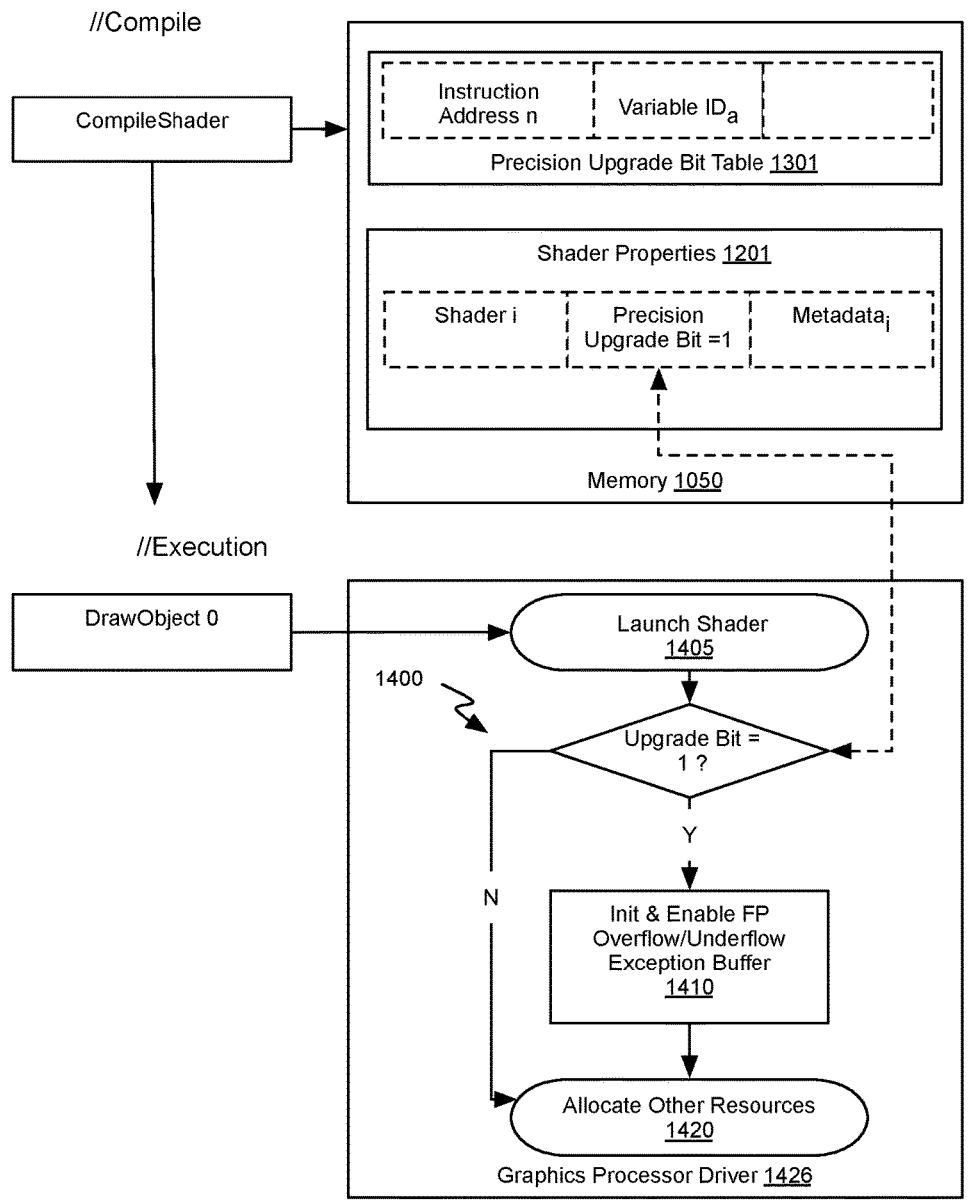
FIG. 14 illustrates launching of a shader in accordance with some embodiments.

FIG. 14 illustrates a shader execution phase in further reference to the compile phase described above. Elements of FIG. 14 having the same reference numbers (or names) as the elements of any other figure herein can operate or function in any manner similar to that described elsewhere herein, but are not limited to such. In accordance with some embodiments, and as depicted in FIG. 14, method 1400 is performed by graphics driver 1425 to launch a shader and allocate graphics processor resources for the shader based at least in part on the precision upgrade bit associated with the shader. Graphics driver 1425 may be user mode graphics driver 1026 (FIG. 10) and/or kernel mode graphics driver 1029. In some immediate mode rendering embodiments, and as illustrated in FIG. 14, method 1400 is performed in response to a draw call. In some deferred rendering embodiments, method 1400 may be performed for a tile.

At operation 1405, the shader is launched, for example by dispatching the shader machine code to the graphics processor. During launch, the graphics driver 1426 accesses memory 1050 and determines the precision upgrade bit value associated with the dispatched shader code. In response to the upgrade bit value indicating the shader being launched is a candidate for precision upgrade (e.g., upgrade bit=1), method 1400 proceeds to operation 1410. At operation 1410 an overflow/underflow exception buffer is initialized and an enable signal in the graphics processor hardware set (e.g., enable signal=1) to trigger detection and storing of exceptions during shading. Other shader hardware resources may be further allocated at operation 1420 in conformance with any known techniques and architectures. At operation 1402 for example, one or more floating point register is configured for less than FP32. In the event the upgrade bit value indicates a shader is not a candidate for a throwing an exception related to an upgradeable low number format precision (e.g., upgrade bit=0), the overflow buffer is not enabled and shader hardware resources are allocated only at operation 1420 in accordance with the dispatched shader code.

Figure 15:
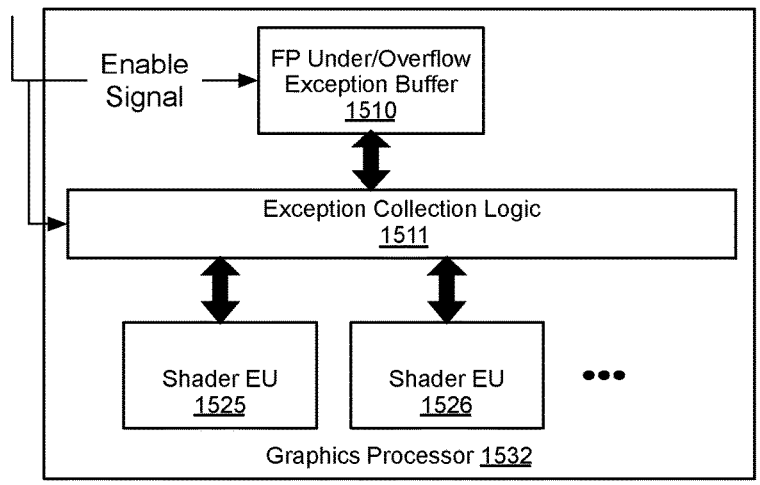
FIG. 15 illustrates a graphics processor including shader execution unit overflow/underflow exception detection and collection logic, in accordance with some embodiments.

In some embodiments, and as illustrated in FIG. 15, hardware systems of a graphics processor 1532 implement exception collection logic 1511 for the detection of overflow/underflow exceptions output by shaders execution units 1525, 1526 as rendering is performed. In other embodiments, any programmable processor (e.g., any processor core) may be configured in a similar manner. In some embodiments, overflow status bits generated during a rendering process are written to floating point registers and/or status registers, triggering input to the overflow buffer 1510. Each element of the overflow/underflow exception buffer 1510 is to store an identifier of an instruction that throws a detected overflow/underflow exception. Any valid entry stored in the exception buffer 1510 is then to be related to the shader variables, for example by a graphics processor driver in accordance with some embodiments. As such, any known hardware architecture capable of detecting and storing overflows for subsequent analysis may be utilized. In some embodiments, and as further illustrated in FIG. 16, graphics processor 1632 includes floating point exception buffer 1610 that may be enabled by the graphics driver (e.g., in response to a precision upgrade bit value=1). Enabled exception buffer 1610 is to store vector data 1615 associating an accumulated number of exceptions with an identifier of an instruction that throws at least one overflow/underflow exception during shader execution. The accumulation field advantageously enables predicating shader precision upgrades on thresholds greater than one.

Figure 16:
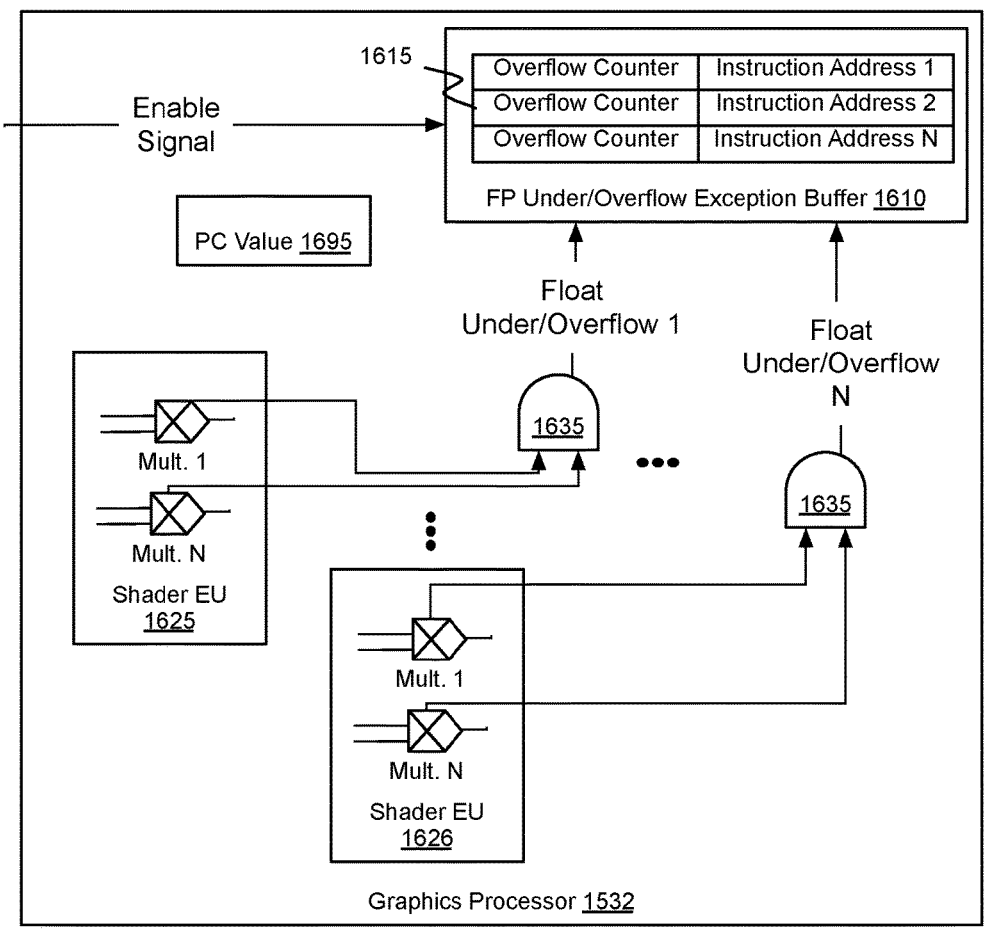
FIG. 16 illustrates shader floating point overflow/underflow exception registering resources, in accordance with some embodiments.

In some embodiments, exception buffer 1610 has an input port coupled to output(s) of multipliers of the shader execution units 1625 and 1626 through one or more logic gate to collect exceptions across the plurality of multipliers. Any underflow/overflow exception thrown from the multipliers (e.g., identified by an overflow status bit, etc.) as the execution units process shader execution threads is passed through AND gates 1625 to exception buffer 1610. In some embodiments further illustrated in FIG. 16, a programmable counter (PC) value 1695 is sampled with each underflow/overflow exception. In some embodiments, the PC value may then be utilized to select the entry in the float overflow buffer that is associated with an instruction address originating the exception. The overflow signal is routed in to increase the corresponding accumulation field of the exception buffer 1601. The complexity of the detection/collection logic is dependent on the algorithmic logic desired for triggering an optimization of the shader code in response to detected collected exceptions. Hence, while FIG. 16 illustrated certain features of exemplary overflow exception monitoring architectures, many other techniques and architectures may be employed by one of ordinary skill to populate a field in floating point exception buffer 1610. For example, embodiments need not rely on AND gates, but may employ any logical gate architecture for the purpose of overflow/underflow exception collection.

Automated Shader Precision Upgrade

Figure 17:
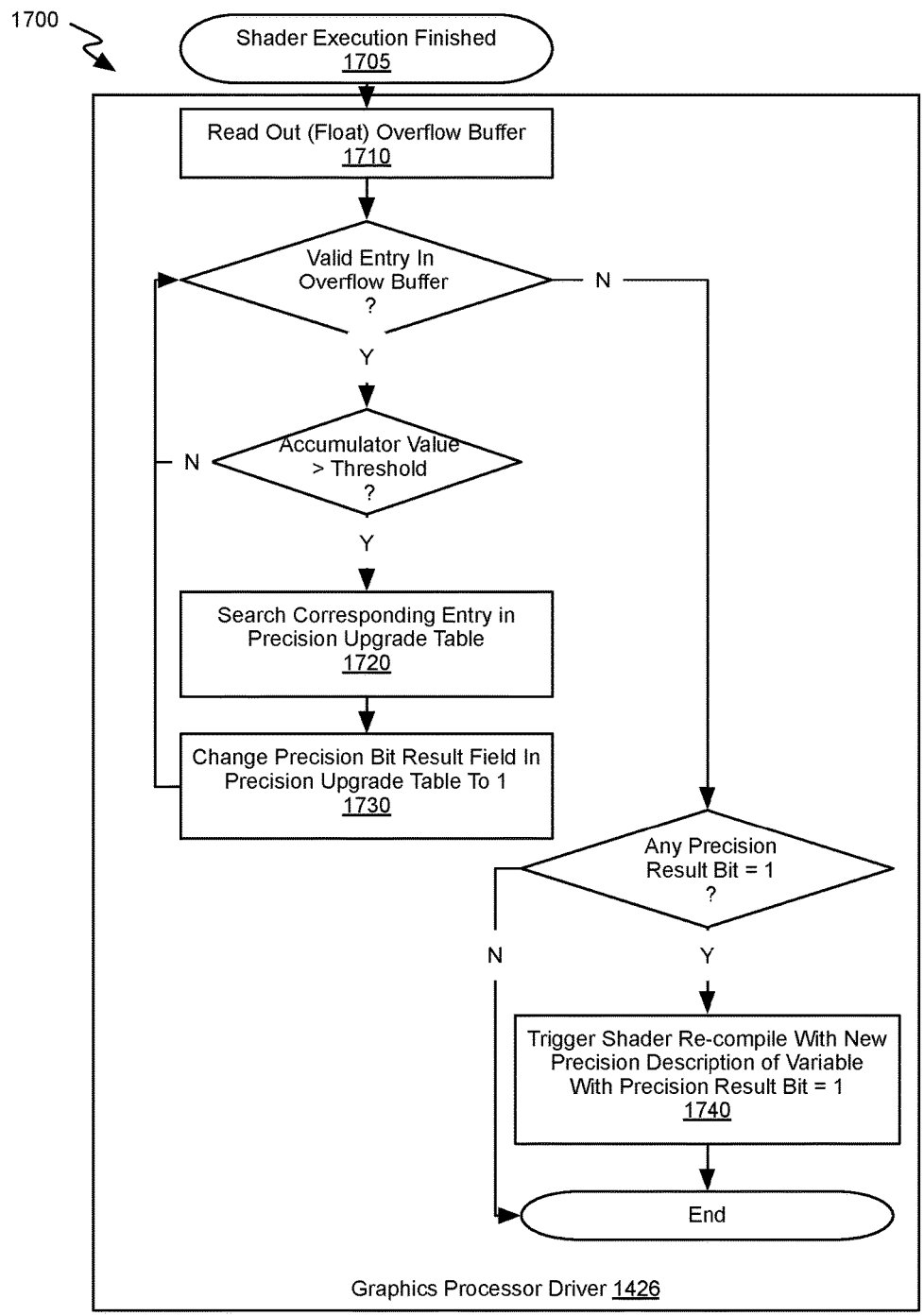
FIG. 17 is a flow diagram illustrating a method of dynamically upgrading a number format precision as needed for one or more shader variable, in accordance with some embodiments.

FIG. 17 is a flow diagram illustrating a method 1700 of dynamically upgrading a number format precision automatically as needed for one or more shader variable, in accordance with some embodiments. Elements of FIG. 17 having the same reference numbers (or names) as the elements of any other figure herein can operate or function in any manner similar to that described elsewhere herein, but are not limited to such. In the illustrative embodiment, method 1700 is performed by a graphics processor driver 1426 executing in-line, or concurrently with graphics object rendering to improve rendering quality through number format precision control. Method 1700 begins at operation 1705 with a shader completing execution (e.g., a draw call is finished or a tile is finished). In response to shader completion, content of the float overflow buffer is read out at operation 1710. In some embodiments, the read out is conditioned on the precision upgrade bit value indicating the shader is a candidate for precision upgrade. Upon readout, if there is any valid entry in the buffer, the graphics processor driver processes each entry one-by-one (e.g., parses the buffer vector data) and accordingly updates the associated exception flag bit.

In some embodiments, if a particular exception accumulator value for any given entry is larger than a predetermined threshold, an associated exception candidate variable identifier is determined at operation 1720 based on the instruction address read out of the exception buffer at operation 1710. In some embodiments, the predetermine threshold is programmable, for example through a graphics driver API. The predetermine threshold may be any number greater than 0 and may be used as a tuning parameter to optimize rendering performance for a given benchmark. In some embodiments, performance of operation 1720 is predicated on more advanced thresholds than a simple exception count, such as, but not limited to, a pixel weighted threshold. For example, the accumulated exception number may be multiplied with the number of pixels rendered during the associated draw call in an immediate rendering mode, or rendered in the associated tile during a tile-based rendering. Depending on the memory architecture, the instruction address read from the overflow buffer may be mapped and/or calculated to a relative address of the instruction that was stored to memory during the shader compile. In some embodiments, and as illustrated at operation 1720, the precision upgrade bit table 1301 (FIG. 13) is searched for an exception candidate address corresponding to the (mapped) instruction address read out at operation 1710 (FIG. 17). In some embodiments, if a match is found the graphics driver is then to further associate the exception candidate address and associated exception candidate variable identifier with an indication that the exceptions exceeded the threshold during execution. For example, at operation 1730 the precision result bit in the precision upgrade bit table 1301 is set to indicate a precision upgrade is needed for the shader variable (e.g., precision result bit=1).

In some embodiments, after all qualifying entries of the overflow buffer have been processed through operations 1720 and 1730, all exception candidate variable identifiers will have an association with either an indication of one or more exception (e.g., precision result bit=1), or not (e.g., precision result bit=0). The graphics processor driver 1426 then determines if a re-compilation is needed. The re-compilation decision may be triggered in response to at least one precision result bit indicating that a candidate shader variable is associated with a an indication that the exceptions exceeded the threshold, as depicted in FIG. 17. In further embodiments, re-compile may be trigger upon satisfying a programmable threshold number of qualifying precision result bits. If the threshold is not met, method 1700 ends with the shader code remaining static with respect to number precision format (i.e., no upgrade is performed). A subsequent launch of the shader, for example triggered by another draw call, proceeds again in conformance with method 1400 (FIG. 14) with a re-initialized exception overflow buffer.

If the exception threshold is met, method 1700 continues to operation 1740 where a shader compiler instance is invoked and instructed to change the value type of at least one of the candidate shader variables. Notably, performance of method 1700 to process overflow buffer output may be pipelined with shading performed for subsequent draw calls or tiles. So, overall rendering performance may be negligibly impacted.

The shader re-compilation triggered at operation 1740 may take any form known and/or proceed by any known technique. The shader machine code may be patched or completely regenerated with the latter implementing either a selective shader precision upgrade or a comprehensive shader precision upgrade. In some embodiments, the shader compiler is instructed to change the value type of each of the variable identifiers stored in the precision bit table 1301 that have a precision upgrade bit indicative of exceptions exceeding the threshold (e.g., precision upgrade bit=1). In some embodiments, the re-generation of higher precision shader machine code entails patching the instruction of one or more of the qualifying candidate variable identifiers. In one advantageous embodiment where a graphics processor implements a medium-p candidate variable identifier with less than FP32 (e.g., FP16), the shader machine code may be re-generated by patching the candidate variable identifier with a different data type suffix (e.g., high-p) for an FP 32 implementation. In other embodiments, re-generation of higher precision shader machine code entails re-compiling the entire shader source code with the register allocation unit getting a hint to assign a high precision data type (e.g., FP32, FP48, FP64, etc.) for the shader variable identifier(s)/address(es) associated with the threshold number of exceptions. In still other embodiments, re-generation of higher precision shader machine code entails re-compiling the entire shader source code with the register allocation unit assigning a high precision data type for all shader variable identifier(s)/address(es) identified in the precision upgrade table. In some embodiments following re-compile, a subsequent launch of the shader further proceeds in conformance with method 1400 (FIG. 14) with a re-initialized exception overflow buffer again enabled if during the re-compile one or more exception candidate shader variables remain.

As a result of a dynamic shader precision upgrade, rendering performance becomes dynamic and automatically optimized for greater rendering quality as a function of the overflow exception handling implemented through the shader compiler and processor driver. Therefore, in some deferred rendering embodiments, a first tile may be rendered by a graphics processor based on data output by a shader in a first state associated with a lower number format precision of the shader variable. Assuming that shader execution results in floating point overflow exceptions, a JIT re-compile is automatically triggered (e.g., by a processor core executing the graphics processor driver and compiler) following the techniques described above. A next shader launch then dispatches the shader in a second state associated with a higher number format precision of the shader variable. A second tile may then be rendered with higher quality by the graphics processor based on shader data output by the re-generated shader.

For some immediate mode rendering embodiments, draw calls in first frame may be rendered by a graphics processor based on data output by a shader in a first state associated with a lower number format precision of the shader variable. Assuming that shader execution results in floating point overflow exceptions, a JIT re-compile is automatically triggered (e.g., by a processor core executing the graphics processor driver and compiler) following the techniques described above. A next shader launch then dispatches the shader in a second state associated with a higher number format precision of the shader variable. Draw calls in a second frame may then be rendered with high quality by the graphics processor based on shader data output by the re-generated shader.

Notably, shader code re-generation for precision upgrading as described for some embodiments above may be performed along with, or as a part of, other shader code optimization algorithms performed in conjunction with rendering. In further embodiments, methods 1100, 1400, and 1700 may be performed repeatedly during the rendering process to continuously ensure a shader is implemented in adequate precision. With the precision automatically upgraded for more shader variables as needed, fewer shader variables may be identified as upgrade candidates in method 1100 until a highest precision shader implementation is achieved.

To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core. The software content of the embodiments described herein can be provided via an article of manufacture with the content stored thereon, or via a method of operating a communication interface to send data via the communication interface.

A non-transitory machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

As exemplified above, embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood to be physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Besides what is described herein, various modifications can be made to the disclosed embodiments and implementations of the invention without departing from their scope. Therefore, the illustrations and examples herein should be construed in an illustrative, and not a restrictive sense. The scope of the disclosure should be measured solely by reference to the claims that follow.

The following paragraphs briefly describe some exemplary embodiments:

In one or more first embodiments, a graphics rendering system, comprises one or more processors to execute shader machine code. The one or more processors further to store to an exception buffer an instruction address associated with one or more overflow or underflow exceptions generated during execution of the shader machine code. The one or more processors further to determine a shader variable associated with the instruction address. The one or more processors further to trigger a modification of the shader machine code to increase the number format precision of the shader variable.

In furtherance of the first embodiment, the one or more processors are to allocate, based on the shader machine code, a first number of bits to the shader variable of a shader data type associated with other than a high precision number format. The one or more processors are to re-generate at least a portion of the shader machine code to increase the precision of the shader variable. The one or more processors are further to allocate, based on the re-generated shader machine code, a second number of bits, greater than the first number of bits, to the shader variable. The one or more processors are further to execute the re-generated shader machine code.

In furtherance of the first embodiment, the one or more processors are further to emit the shader machine code based on shader language instructions. The one or more processors are further to identify one or more shader variable defined in the shader language instructions as a candidate for throwing an overflow or underflow exception. The one or more processors are further to store an instruction address in association with an identifier of the one or more exception candidate variable. The one or more processors are further to set a precision upgrade property associated with the shader machine code indicative of the shader including at least one exception candidate variable.

In furtherance of the embodiment immediately above, the one or more processors further comprise a first processor to execute the shader machine code and store to the exception buffer, and a second processor to determine the shader variable, and trigger the modification of the shader machine code. The second processor is further to dispatch the shader machine code to the first processor. The second processor is further to enable exception registering resources on the first processor, the resources including the exception buffer. The second processor is further to determine, from the instruction address stored to the exception buffer, the exception candidate variable identifier associated with the exception.

The second processor is further to associate the exception candidate variable identifier with an indication of the exception. The second processor is further to increase the number format precision of the shader variable associated with the indication of the exception.

In furtherance of the embodiment immediately above, the second processor is further to compare an exception count threshold to a count of exceptions stored to the exception buffer in association with the instruction address. The second processor is further to set an exception flag bit associated with the identifier of the one or more exception candidate variable, the exception flag bit set to a value indicative of the candidate variable exceeding the threshold exception count. The second processor is further to re-compile the shader language instructions with the number format precision of the shader variable increased.

In furtherance of the first embodiment, the exception buffer further comprises an accumulation field associated with an instruction address. The exception buffer is coupled through one or more logic gate to collect an exception from a plurality of multipliers of a shader execution unit. The one or more processors are to increase a count of exceptions stored to the accumulation field of the exception buffer in response to receiving an exception status bit value from one of the multipliers that is indicative of an overflow or underflow exception.

In furtherance of the embodiment immediately above, the accumulation field associated with an instruction address is selected based on a value of a programmable counter sampled in response receiving an exception status bit indicative of an overflow or underflow exception.

In furtherance of the first embodiment, the one or more processors comprise graphics processor execution unit, and a processor core. The shader variable is of a floating point data type. The second number of bits is at least 16 bits greater than the first number of bits. The processor core is to cause generation of a first frame, or a first portion of a frame, based on data output from the shader with the first number of bits allocated to the variable, and cause generation of a second frame, or a second portion of the frame, based on data output from the shader with the second number of bits allocated to the variable.

In one or more second embodiments, a computer-implemented graphics rendering method, comprises launching a shader that will allocate a first number of bits to a shader variable of a shader data type associated with other than a high precision number format. The method further comprises storing an instruction address associated with one or more overflow or underflow exceptions generated during execution of the shader. The method further comprises determining a shader variable associated with the instruction address. The method further comprises re-generating at least a portion of the shader machine code with the number format precision of the shader variable increased to allocate a second number of bits, greater than the first number of bits. The method further comprises launching the shader with the re-generated machine code.

In furtherance of the second embodiment, the method further comprises emitting shader machine code compiled from shader language instructions. The method further comprises identifying one or more shader variable defined in the shader language instructions as a candidate for throwing an exception. The method further comprises storing an exception candidate instruction address in association with an identifier of the one or more exception candidate variable.

In furtherance of the embodiment immediately above, the method further comprises launching the shader by dispatching the shader machine code to a graphics processor. The method further comprises enabling exception registering resources, the enabling including initializing the exception buffer. The method further comprises determining, from the instruction address stored to the exception buffer, the exception candidate variable identifier associated with the exception. The method further comprises associating the exception candidate variable identifier with an indication of the exception. The method further comprises re-generating of at least a portion of the shader machine code based on the exception indication.

In furtherance of the embodiment immediately above, the method further comprises comparing an exception count threshold to a count of exceptions stored to the exception buffer in association with the instruction address. Associating the exception candidate variable identifier with an indication of the exception further comprises setting an exception flag bit associated with the identifier of the one or more exception candidate variable, the exception flag bit set to a value indicative of the candidate variable exceeding the threshold exception count.

In furtherance of the second embodiment, the shader variable is of floating point data type; and the shader variable is increased to a number format that is at least 16 bits greater than the first number of bits.

In furtherance of the second embodiment, determining the exception candidate variable identifier further comprises mapping the instruction address to a relative address stored in association with the exception candidate variable identifier.

In furtherance of an embodiment above, the method further comprises re-generating at least a portion of the shader machine code and further comprises patching one or more of the shader language instructions to associate the shader variable with a precision qualifier indicative of the high precision number format.

In furtherance of the second embodiment, the method further comprises executing the shader, generating a first frame, or a first portion of a frame, based on data determined by the shader execution. The method further comprises storing the instruction address associated with one or more overflow or underflow exceptions to the exception buffer, executing the re-generated shader with the second number of bits allocated to the shader variable, and generating a second frame, or a second portion of the frame, based on data determined by the re-generated shader execution.

In furtherance of the second embodiment, the exception buffer further comprises an accumulation field associated with an instruction address. The exception buffer is coupled through an one or more logic gate to collect an exception from a plurality of multipliers of a shader execution unit. The method further comprises increasing a count of exceptions stored to the accumulation field of the exception buffer in response to receiving an exception status bit value from one of the multipliers that is indicative of an overflow or underflow exception.

In furtherance of the embodiment immediately above, the method further comprises sampling a programmable counter (PC) in response receiving an exception status bit value indicative of an overflow or underflow exception. The method further comprises selecting the accumulation field associated with an instruction address based on the sampled value from the PC.

In one or more third embodiments, a computer-implemented graphics rendering method comprises executing a first time a shader that allocates a first number of bits to a shader variable of a shader data type associated with other than a high precision number format. The method further comprises rendering a first frame, or a first portion of a frame, based on data determined by the first shader execution. The method further comprises storing to an exception buffer the instruction address associated with one or more overflow or underflow exceptions triggered by the shader execution. The method further comprises executing a second time the shader with a second number of bits allocated to the shader variable. The method further comprises rendering a second frame, or a second portion of the frame, based on data determined by the second shader execution.

In furtherance of the third embodiments, the exception buffer further comprises an accumulation field associated with an instruction address. The exception buffer is coupled through one or more logic gate to collect an exception from a plurality of multipliers of a shader execution unit. The method further comprises increasing a count of exceptions stored to the accumulation field of the exception buffer in response to receiving an exception status bit value from one of the multipliers that is indicative of an overflow or underflow exception.

In the embodiment immediately above, the method further comprises sampling a programmable counter (PC) in response receiving an exception status bit value indicative of an overflow or underflow exception. The method further comprises selecting the accumulation field associated with an instruction address based on the sampled value from the PC.

In one or more fourth embodiments, a computerized graphics rendering device, comprising a means to perform any of the third embodiments described above.

In furtherance of the fourth embodiments, the means further comprises a first processor including a programmable shader execution unit to execute the shader code and store exceptions to the exception buffer. The means further comprises a second processor to execute a driver to determine the shader variable associated with the instruction address compiler to re-generate. The means further comprises the second processor to execute a compiler and increase the number format precision of the shader variable.

In one or more fifth embodiments, one or more computer-readable storage media has instructions stored thereon, which when executed by one or more processor, cause the one or more processors to perform any one of the third embodiments described above. In one or more sixth embodiments, one or more computer-readable storage media, with instructions stored thereon, which when executed by one or more processor, cause the one or more processors to perform a method comprising: launching a shader that will allocate a first number of bits to a shader variable of a shader data type associated with other than a high precision number format; storing an instruction address associated with one or more overflow or underflow exceptions generated during execution of the shader; determining a shader variable associated with the instruction address; re-generating at least a portion of the shader machine code with the number format precision of the shader variable increased to allocate a second number of bits, greater than the first number of bits; and launching the shader with the re-generated machine code.

In furtherance of the fifth embodiment, the one or more computer-readable storage media has instructions stored thereon, which when executed by one or more processor, cause the one or more processors to perform a method further comprising emitting shader machine code from shader language instructions, identifying one or more shader variable defined in the shader language instructions as a candidate for throwing an exception, storing an instruction address in association with an identifier of the one or more exception candidate variable, enabling exception registering resources, the allocating including initializing the exception buffer, determining, from the instruction address stored to the exception buffer, the exception candidate variable identifier associated with the exception, associating the exception candidate variable identifier with an indication of the exception and re-generating of at least a portion of the shader machine code based on the exception indication.

In one or more sixth embodiment, one or more computer-readable storage media has instructions stored thereon, which when executed by one or more processor, cause the one or more processors to perform a method comprising executing a first time a shader that allocates a first number of bits to a shader variable of a shader data type associated with other than a high precision number format, generating a first frame, or a first portion of a frame, based on data determined by the first shader execution, storing the instruction address associated with one or more overflow or underflow exceptions to the exception buffer, executing a second time the shader with a second number of bits allocated to the shader variable, and generating a second frame, or a second portion of the frame, based on data determined by the second shader execution.

In furtherance of the sixth embodiment, the one or more computer-readable storage media of has instructions stored thereon, which when executed by one or more processors, cause the one or more processors to perform a method further comprising sampling a programmable counter (PC) in response receiving an exception status bit value indicative of an overflow or underflow exception, selecting an accumulation field of the exception buffer associated with an instruction address based on the sampled value from the PC, and increasing a count of exceptions stored to the accumulation field in response to receiving an exception status bit value from one of a plurality of multipliers that is indicative of an overflow or underflow exception.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. A graphics rendering system, comprising:
   one or more processors to:
   allocate, based on shader machine code, a first number of bits to shader variables of a shader data type associated with a first number format precision that is other than high precision;
   execute the shader machine code;
   store to an exception buffer an instruction address associated with one or more overflow or underflow exceptions generated during execution of the shader machine code;
   identify one of the shader variables associated with the instruction address;

re-generate at least a portion of the shader machine code with a second number format precision for the identified one of the shader variables, the second number format precision increased from the first number format precision in response to the overflow or underflow exceptions;

allocate, based on the re-generated shader machine code, a second number of bits to the identified one of the shader variables, the second number of bits greater than the first number of bits; and execute the re-generated shader machine code.

2. The system of claim 1, wherein the one or more processors are further to:

emit the shader machine code based on shader language instructions;

identify one or more shader variables defined in the shader language instructions as a candidate for throwing an overflow or underflow exception;

store an instruction address in association with an identifier of the one or more exception candidate variable; and set a precision upgrade property associated with the shader machine code indicative of the shader including at least one exception candidate variable.

3. The system of claim 2, wherein:

the one or more processors further comprise:

a first processor to execute the shader machine code and store to the exception buffer; and a second processor to identify one of the shader variables, and trigger the modification of the shader machine code;

the second processor is further to:

dispatch the shader machine code to the first processor;

enable exception registering resources on the first processor, the resources including the exception buffer;

determine, from the instruction address stored to the exception buffer, the exception candidate variable identifier associated with the exception;

associate the exception candidate variable identifier with an indication of the exception; and increase the number format precision the shader variable associated with the indication of the exception.

4. The system of claim 3, wherein the second processor is further to:

compare an exception count threshold to a count of exceptions stored to the exception buffer in association with the instruction address;

set an exception flag bit associated with the identifier of the one or more exception candidate variables, the exception flag bit set to a value indicative of the candidate variable exceeding the threshold exception count; and re-compile the shader language instructions with the number format precision of the shader variables increased for those candidate variables having the exception flag bit set to the value.

5. The system of claim 1, wherein:

the exception buffer further comprises an accumulation field associated with an instruction address;

the exception buffer is coupled through one or more logic gate to collect an exception from a plurality of multipliers of a shader execution unit; and the one or more processors are to increase a count of exceptions stored to the accumulation field of the exception buffer in response to receiving an exception status bit value from one of the multipliers that is indicative of an overflow or underflow exception.

6. The system of claim 5, wherein the accumulation field associated with an instruction address is selected based on a value of a programmable counter sampled in response receiving an exception status bit indicative of an overflow or underflow exception.

7. The system of claim 1, wherein:

the one or more processors comprise graphics processor execution unit, and a processor core;

the shader data type is of a floating point data type;

the second number of bits is at least 16 bits greater than the first number of bits; and the processor core is to:

cause generation of a first frame, or a first portion of a frame, based on data output from the shader with the first number of bits allocated to the variable; and cause generation of a second frame, or a second portion of the frame, based on data output from the shader with the second number of bits allocated to the variable.

8. A computer-implemented graphics rendering method, comprising: dispatching shader machine code to a graphics processor, the graphics processor to allocate, based on the shader machine code, a first number of bits to shader variables of a shader data type associated with a first precision number format that is other than a high precision number format;

storing, to an exception buffer, an instruction address associated with one or more overflow or underflow exceptions generated during execution of the shader;

identifying one of the shader variables associated with the instruction address;

re-generating at least a portion of the shader machine code with a second number format precision for the identified one of the shader variables, the second number format precision increased, from the first number format precision; and launching the shader with the re-generated shader machine code, the graphics processor to allocate, based on the re-generated shader machine code, a second number of bits to the identified one of the shader variables, the second number of bits greater than the first number of bits.

9. The method of claim 8, further comprising:

emitting shader machine code compiled from shader language instructions;

identifying one or more shader variable defined in the shader language instructions as a candidate for throwing an exception; and storing an exception candidate instruction address in association with an identifier of the one or more exception candidate variable.

10. The method of claim 9, further comprising:

enabling exception registering resources, the enabling including initializing the exception buffer;

determining, from the instruction address stored to the exception buffer, the exception candidate variable identifier associated with the exception;

associating the exception candidate variable identifier with an indication of the exception; and re-generating at least a portion of the shader machine code based on the exception indication.

11. The method of claim 10, further comprising comparing an exception count threshold to a count of exceptions stored to the exception buffer in association with the instruction address; and, wherein associating the exception candidate variable identifier with an indication of the exception further comprises setting an exception flag bit associated with the identifier of the one or more exception candidate variables, the exception flag bit set to a value indicative of the candidate variable exceeding the threshold exception count.

12. The method of claim 10, wherein determining the exception candidate variable identifier further comprises mapping the instruction address to a relative address stored in association with the exception candidate variable identifier.

13. The method of claim 8 wherein:
the shader data type is of floating point data type; and
the shader variable is increased to a number format that is at least 16 bits greater than the first number of bits.

14. The method of claim 8, wherein re-generating at least a portion of the shader machine code further comprises patching one or more of the shader language instructions to associate the shader variable with a precision qualifier indicative of the second precision number format.

15. The method of claim 8, further comprising:
executing the shader;
generating a first frame, or a first portion of a frame, based on data determined by the shader execution;
storing the instruction address associated with one or more overflow or underflow exceptions to the exception buffer;
executing the re-generated shader with the second number of bits allocated to the shader variable; and
generating a second frame, or a second portion of the frame, based on data determined by the re-generated shader execution.

16. The method of claim 8, wherein:
the exception buffer further comprises an accumulation field associated with an instruction address;
the exception buffer is coupled through an one or more logic gate to collect an exception from a plurality of multipliers of a shader execution unit; and
the method further comprises increasing a count of exceptions stored to the accumulation field of the exception buffer in response to receiving an exception status bit value from one of the multipliers that is indicative of an overflow or underflow exception.

17. The method of claim 16, further comprising:
sampling a programmable counter (PC) in response receiving an exception status bit value indicative of an overflow or underflow exception; and
selecting the accumulation field associated with an instruction address based on the sampled value from the PC.

18. One or more non-transitory computer-readable storage media, with instructions stored thereon, which when executed by one or more processor, cause the one or more processors to perform a method comprising:
dispatching shader machine code to a graphics processor, the graphics processor to allocate, based on the shader machine code, a first number of bits to shader variables of a shader data type associated with a first precision number format that is other than a high precision number format;
storing, to an exception buffer, an instruction address associated with one or more overflow or underflow exceptions generated during execution of the shader;
identifying one of the shader variables associated with the instruction address;
re-generating at least a portion of the shader machine code with a second number format precision of the identified one of the shader variables, the second number format precision increased from the first number format precision; and
launching the shader with the re-generated machine code, the graphics processor to allocate, based on the re-generated shader machine code, a second number of bits to the identified one of the shader variables, the second number of bits greater than the first number of bits.

19. The one or more non-transitory computer-readable storage media of claim 18, with instructions stored thereon, which when executed by one or more processor, cause the one or more processors to perform a method further comprising:
emitting shader machine code from shader language instructions;
identifying one or more shader variable defined in the shader language instructions as a candidate for throwing an exception;
storing an instruction address in association with an identifier of the one or more exception candidate variable;
enabling exception registering resources, the allocating including initializing the exception buffer;
determining, from the instruction address stored to the exception buffer, the exception candidate variable identifier associated with the exception;
associating the exception candidate variable identifier with an indication of the exception; and
re-generating of at least a portion of the shader machine code based on the exception indication.

* * * * *